United States Patent
Yi et al.

(10) Patent No.: US 6,868,064 B2
(45) Date of Patent: Mar. 15, 2005

(54) METHOD FOR CONFIRMING RECEIPT OF PROTOCOL DATA

(75) Inventors: Seung June Yi, Seoul (KR); Jin Young Park, Kyonggi-do (KR)

(73) Assignee: LG Electronics Inc. (KR)

( * ) Notice: Subject to any disclaimer, the term of this patent is extended or adjusted under 35 U.S.C. 154(b) by 817 days.

(21) Appl. No.: 09/877,104

(22) Filed: Jun. 11, 2001

(65) Prior Publication Data

US 2002/0015385 A1 Feb. 7, 2002

(30) Foreign Application Priority Data

Jul. 1, 2000 (KR) .......................................... 2000-37528

(51) Int. Cl.[7] .............................................. H04L 12/26
(52) U.S. Cl. .................... 370/236; 370/231; 370/346; 370/449; 714/1; 714/748; 709/232
(58) Field of Search ............................... 370/230–238, 370/477, 346, 449; 714/1, 748; 709/232–235

(56) References Cited

U.S. PATENT DOCUMENTS

| | | | |
|---|---|---|---|
| 6,219,713 B1 * | 4/2001 | Ruutu et al. ................ | 709/235 |
| 2003/0081664 A1 * | 5/2003 | Lu et al. ..................... | 375/222 |
| 2003/0095534 A1 * | 5/2003 | Jiang .......................... | 370/346 |

FOREIGN PATENT DOCUMENTS

JP 2004-179916 A * 6/2004 ........... H04L/12/28

OTHER PUBLICATIONS

Nasir Ghani et al., TCP/IP Enhancements for Satellite Networks, Jul. 1999, IEEE, 0163–6804/99, pp. 64–72.*
Byung–Gon Chun et al., Auxiliary Timeout and Selective Packet Discard Schemes to Improve TCP Performance in PCN Environment, 1997, IEEE, 0–7803–3925–8/97, pp. 381–385.*
3GPP TSG–RAN WG2 Meeting#25, Change Request 25.322 CR 156 Rev. 4.2.0, Nov. 2001, Makuhari, Japan, pp. 1–2 and 40–44.*

* cited by examiner

*Primary Examiner*—Dang Ton
*Assistant Examiner*—Tri H. Phan
(74) *Attorney, Agent, or Firm*—Fleshner & Kim, LLP

(57) ABSTRACT

A method of confirming a receipt of protocol data units (PDU) that can eliminate the starting point polling problem of the conventional window-based polling algorithm widely used in a radio link control is disclosed. The conventional window-based polling algorithm is modified in such a way that the unwanted polling is eliminated when transmitting the protocol data units at the starting point of the communication window.

9 Claims, 2 Drawing Sheets

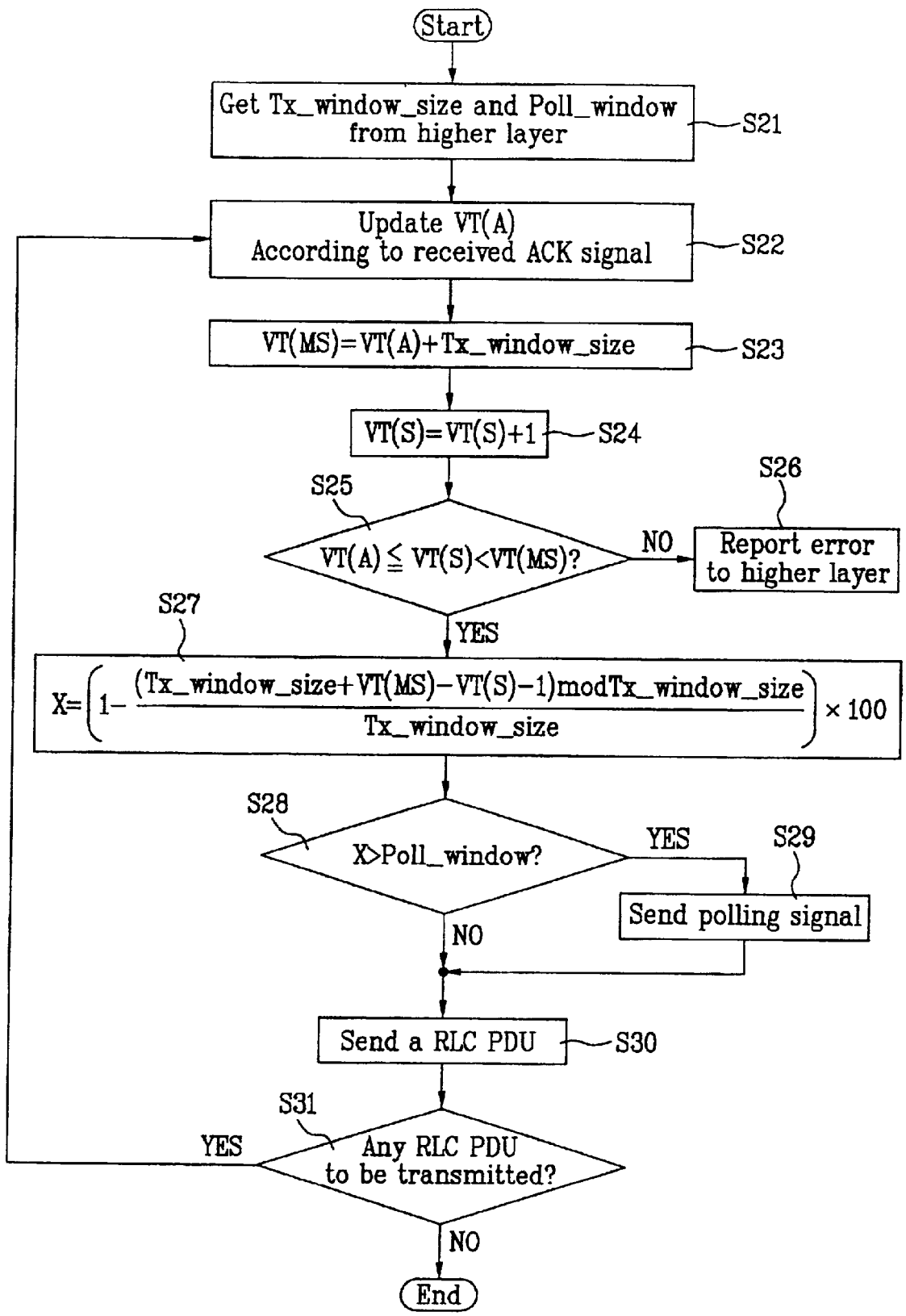

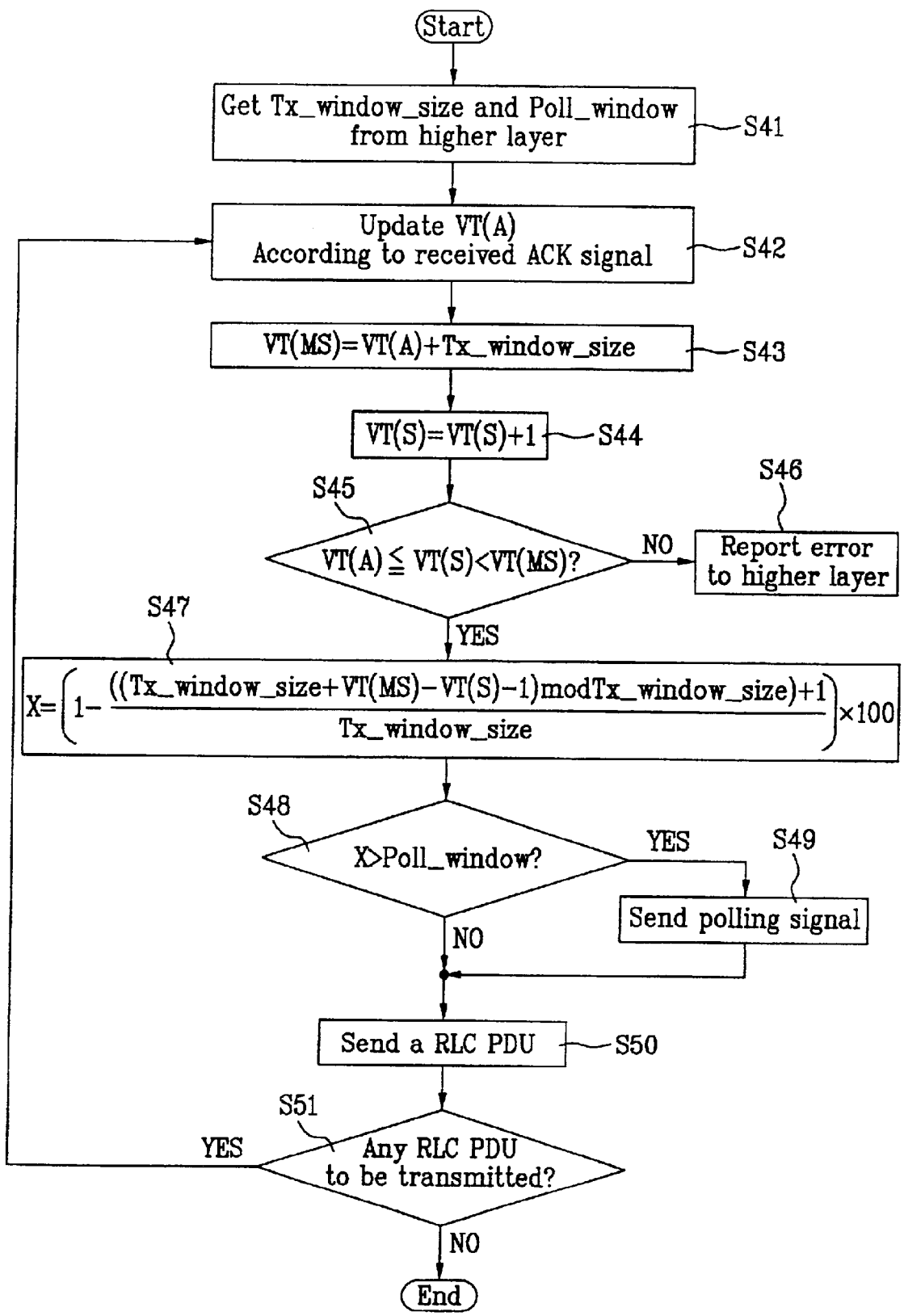

METHOD FOR CONFIRMING RECEIPT OF PROTOCOL DATA

BACKGROUND OF THE INVENTION

1. Field of the Invention

The present invention relates to an advanced mobile communication, and more particularly, to a method for confirming a receipt of protocol data units (hereinafter, "PDU") which can eliminate the starting point polling problem of the window-based polling algorithm used in a radio link control (hereinafter, "RLC").

2. Background of the Related Art

Generally, "Polling" means that an originating system requests a receiving system to receive a status report. Then a radio link control (RLC) layer receives the status report from the receiving system and controls the error and/or data flow.

After the originating system sends a given set of radio link control protocol data units (RLC PDU) to the receiving system, the originating system sends a polling signal to the receiving system to check whether the receiving system has received all the data units properly. Then the receiving system sends the status report indicating an acknowledgement (hereinafter, "ACK") or a negative acknowledgement (hereinafter, "NACK") for each individual RLCPDU after checking a receiving status for all the data units which the originating system has sent.

A window based polling method is one of typical methods for transmitting a polling signal to the receiving system. When using the window based polling method, polling occurs if the number of RLC PDUs transmitted to the receiving system exceeds a predetermined limiting value. In other words, Polling occurs when the following condition is satisfied.

$$\left[ 1 - \frac{(Tx\_window\_size + VT(MS) - VT(S)) \mod Tx\_window\_size}{Tx\_window\_size} \right] \times 100 = $$

$$X > \text{Poll\_window}(\%)$$

[Equation 1]

Tx_window_size in Equation 1 is a communication window size which represents the maximum number of RLC PDUs that can be transmitted at once in a communication system. VT(S) is a send state variable which represents the sequence number of the first PDU of the RLC PDUs subjected to be transmitted next, and it increases by one after each PDU is transmitted. VT(MS) is a maximum send status variable which represents the sequence number of the first PDU of the RLC PDUs not subjected to be transmitted. Therefore, the largest sequence number of the PDUs subjected to be transmitted is VT(MS)-1. The maximum send status variable forms an upper edge of the communication window, and its relationship to the communication window size is described in the following equation, $$VT(MS)=VT(A)+Tx\_window\_size$$

where VT(A) is an acknowledge state variable which represents the sequence number of the first PDU of the RLC PDUs required to receive an ACK signal for the next transmission, and it forms a lower edge of the communication window. Therefore, the value of VT(S) can be between VT(A) (minimum) and VT(MS)-1 (maximum).

After the originating system receives the status report indicating ACK/NACK status of each PDU sent to the receiving system, the value of VT(A) is updated to the sequence number of the PDU required to receive the next ACK, and VT(MS) is reevaluated by the above equation.

Poll_window in Equation 1 is a limiting value for the window-based polling algorithm which limits the number of the RLC PDUs subjected to be transmitted. In other words, the originating system sends the polling signal to the receiving system when the number of the transmitted RLC PDUs is larger than the predetermined value of Poll_window.

When VT(S) is equal to VT(A) in Equation 1, the value of X is 100 which is always larger than Poll_window. Therefore, the polling always occurs when transmitting the PDUs at the starting point of the communication window (VT(S)=VT(A)). This starting point polling problem reduces the data processing capacity of the whole communication system, and creates the protocol errors in the transmitting or receiving system.

SUMMARY OF THE INVENTION

Accordingly, an object of the present invention is to solve at least the problems and disadvantages of the related art.

The main object of present invention is to provide a method of confirming a receipt of protocol data units which will eliminate the starting point polling problem of the conventional window-based polling algorithm while reducing the total number of polling in the system at the same time. Once the above object is achieved, the overload of the system and protocol errors between the transmitting and receiving systems can be prevented, and consequently it will increase the data processing capacity of the whole communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the objects and in accordance with the purposes of the invention, as embodied and broadly described herein, a method for confirming the receipt of the protocol data units in a mobile communication system includes sending a poling signal to a receiving system during a transmission of protocol data units (PDU) when following conditions are satisfied, (1) the sequence number of the next PU to be transmitted for the first time (VT(S)) is smaller than the sequence number of the first PU not allowed by the peer receiver (VT(MS)) and (2) the window transmission percentage (X) is bigger than the parameter which indicates when the transmitter should poll the receiver in case of performing window-based polling (Poll_Window), wherein the equation for window transmission percentage (X) is a function of the sequence number of the next PU to be transmitted for the first time (VT(S)), and do not have maximum value when the sequence number of next PU to be transmitted for the first time (VT(S)) equals to the sequence number of the first PU not allowed by the peer receiver (VT(MS)).

The equation is one of followings:

$$\left[1 - \frac{(Tx\_window\_size + VT(MS) - VT(S) - 1) \bmod Tx\_window\_size}{Tx\_window\_size}\right] \times 100 = X > \text{Poll\_window}(\%)$$

or $$\left[1 - \frac{(Tx\_window\_size + VT(MS) - VT(S) - 1) \bmod Tx\_window\_size) + 1}{Tx\_window\_size}\right] \times 100 =$$

$$X > \text{Poll\_window}(\%),$$

where Tx_window_size represents a maximum number of said protocol data units that can be transmitted, VT(MS) represents a lowest sequence number of said protocol data units not subjected to be transmitted, VT(S) represents a sequence number of said protocol data unit subjected to be transmitted next, and Poll_window represents a limiting value which limits a number of said protocol data units subjected to be transmitted.

It is to be understood that both the foregoing general description and the following detailed description of the present invention are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein:

FIG. 1 is a flow chart of a window-based polling algorithm according to the first embodiment of the invention; and FIG. 2 is a flow chart of a widow-based polling algorithm according to the second embodiment of the invention.

DETAILED DESCRIPTION OF THE INVENTION

Reference will now be made in detail to the preferred embodiments of the present invention, examples of which are illustrated in the accompanying drawings.

The present invention suggests two window-based polling algorithms to solve the starting point polling problem in the window-based polling system, and they are described in the following two equations.

$$\left[1 - \frac{(Tx\_window\_size + VT(MS) - VT(S) - 1) \bmod Tx\_window\_size}{Tx\_window\_size}\right] \times 100 = \quad [\text{Equation 2}]$$

$$X > \text{Poll\_window}(\%)$$

$$\left[1 - \frac{((Tx\_window\_size + VT(MS) - VT(S) - 1) \bmod Tx\_window\_size) + 1}{Tx\_window\_size}\right] \times 100 = \quad [\text{Equation 3}]$$

$$X > \text{Poll\_window}(\%)$$

Tx_window_size in the Equation 2 and 3 is a communication window size which represents the maximum number of RLC PDUs subjected to be transmitted at once in a communication system. VT(S) is a send state variable which represents the sequence number of the first PDU among the RLC PDUs subjected to be transmitted next, and it increases by one after each RLC PDU is transmitted. VT(MS)is a maximum send status variable which represent the sequence number of the first PDU of the RLC PDUs that are not subjected to be transmitted. Therefore the largest sequence number of the PDUs subjected to be transmitted is VT(MS)-1. The maximum send status variable forms an upper edge of the communication window, and its relationship to the communication window size, Tx_window_size is described in the following equation, $$VT(MS) = VT(A) + Tx\_window\_size \quad \text{Equation 4}$$

where VT(A) is an acknowledge state variable which represents the sequence number of the first PDU among the RLC PDUs subjected to have ACK status, and it forms a lower edge of the communication window. Therefore, the value of VT(S) can be between VT(A) (minimum) and VT(MS)-1 (maximum).

After the originating system receives the status report indicating ACK/NACK status for each PDU from the receiving system, the value of VT(A) is updated to the sequence number of the PDU subjected to receive the next ACK, and VT(MS) is recalculated by the Equation 4.

Poll_window is a limiting value for window-based polling which limits the number of the RLC PDUs subjected to be transmitted. In other words, the originating system sends the polling signal to the receiving system when the number of the transmitted RLC PDUs is larger than a predetermined value of Poll_window.

The steps of transmitting the window-based polling signal including the new polling algorithms are illustarated in FIG. 1 and FIG. 2. First, the values of Tx_window_size and Poll_window are given from the upper layer to the RLC layer (S21, S41). The RLC layer then updates the value of VT(A) to the lowest sequence number of the PDUs required to be transmitted next based on the status report received from the receiving system (S22, S42) Using the updated value of VT(A), VT(MS) can be found by the Equation 4 (S23, S43). The value of VT(S) increases by one after each PDU is transmitted (S24, S44). Thereafter, it checks whether VT(S) is greater than or equal to VT(A) and is less than VT(MS) (S25, S45). The step S27 or S47 will be invoked only if both conditions described in the step S25 or S45 are met, and otherwise, a protocol error occurs, and this error will be reported to the upper layer (S26, S46). The value of X is calculated in the step S27 or S47 by using the Equation 2 or 3 (S27, S47), and it decides whether to send the polling signal to the receiving system by comparing the value of X to Poll_window (S28, S48). If the value of X is larger than Poll_window, the polling will occur by sending the polling signal to the receiving system (S29, S49). Next, the next RLC PDU having its sequence number equal to VT(S) is transmitted to the receiving system (S30, S50), and the system checks whether the transmission of RLC PDUs is completed by checking if the value of VT(S) is equal to VT(MS)-1 (S31, S51). If it is not, then the system determines if it needs to update the value of VT(A) (S22, S42), and repeats all the steps again. It is important to note that the value of VT(A) is updated only when the polling has occurred (status report is received). If there is no polling, the values of VT(A) and VT(MS) will not be changed until the transmission is completed.

For example, let's assume that the values of VT(A), Tx_window_size, and Poll window in the Equation 2 are 11, 100, and 40% respectively. So the value of VT(MS) is VT(MS)=VT(A)+Tx_window_size=11+100=111. If the value of VT(S) is equal to VT(A) which is 11, X in the Equation 2 becomes 1, so there is no starting point polling. However, if the value of VT(S) is 51, X becomes 41 which is larger than Poll_window causing the polling to occur.

This polling is desired for the effective error and flow controls in the communication system. As it can be seen from this example, the starting point polling problem is eliminated when the Equation 2 is used in the polling algorithm. After the receiving system receives the polling signal from the originating system, it sends the status report indicating which PDU is transmitted. If the PDU corresponding to the sequence number 33 is not received when the PDUs corresponding to the sequence number 11–51 are sent by the originating system, then the status report will indicate NACK for the PDU corresponding to the sequence number 33 and ACK for all others (PDUs SE#11–32,34–51). Therefore, the values of VT(A) and VT(MS) for the next calculation of X become 33 and 133 respectively.

Using the Equation 3 in the above example, there is no polling (X=0, 40) when VT(S) is 11 or 51. However, the polling occurs (X=41) when VT(S) is 52. Again, there is no starting point polling, and it delays the polling occurred in the Equation 2 by one sequence number.

TABLE 1

| VT (S) = | X in Eq1 | X in Eq2 | X in Eq3 |
|---|---|---|---|
| VT (A) | 100 | 1/Tx*100 | 0 |
| VT (A) + 1 | 1/Tx*100 | 2/Tx*100 | 1/Tx*100 |
| VT (A) + 2 | 2/Tx*100 | 3/Tx*100 | 2/Tx*100 |
| . | . | . | . |
| . | . | . | . |
| . | . | . | . |
| VT (MS) − 3 | (Tx − 3)/Tx*100 | (Tx − 2)/Tx*100 | (Tx − 3)/Tx*100 |
| VT (MS) − 2 | (Tx − 2)/Tx*100 | (Tx − 1)/Tx*100 | (Tx − 2)/Tx*100 |
| VT (MS) − 1 | (Tx − 1)/Tx*100 | 1*100 | (Tx − 1)/Tx*100 |

Table 1 shows the general terms of X by substituting the Equation 4 into the Equation 1, 2, and 3 respectively. As it can be seen from the table, the starting point polling always occurs (X=100) when VT(S) is equal to VT(A) using the Equation 1. However, this problem is eliminated by using Equation 2 and 3.

As it is shown, the present invention eliminates the starting point polling problem which the prior algorithm has, and concurrently, eases the overload in the system by reducing the number of polling in the communication system. Additionally, protocol errors between the transmitting and receiving systems can also be prevented. Consequently, it increases the data process capacity of the whole communication system.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modification, and variations will be apparent to those skilled in the art.

What is claimed is:

1. A method of confirming a receipt of protocol data unit in a mobile communication system, the method comprising a step of sending a polling signal to a receiving system during a transmission of protocol data units (PDU) when the following conditions are satisfied, (1) sequence number of the next PDU to be transmitted for a first time (VT(S)) and is smaller than the sequence number of the first PU not allowed by a peer receiver (VT(MS))

(2) window transmission percentage (X) is bigger than a parameter which indicates when the transmitter should poll the receiver in case of performing window-based polling(Poll_Window), wherein the equation for window transmission percentage (X) is a function of the sequence number of the next PU to be transmitted for the first time (VT(S)), and do not have maximum value when the sequence number of the next PU to be transmitted for the first time (VT(S)) equals to the sequence number of the first PU not allowed by the peer receiver (VT(MS)).

2. The method as claimed in claim 1, wherein the equation is as follows, $$\left[1 - \frac{(Tx\_window\_size + VT(MS) - VT(S) - 1) mod\ Tx\_window\_size}{Tx\_window\_size}\right] \times 100 = X > \text{Poll\_window}(\%),$$

where

Tx_window_size represents a maximum number of said protocol data units that can be transmitted.

3. The method as claimed in claim 2, wherein the values of said Tx_window_size and said Poll_window are obtained from an upper layer.

4. The method as claimed in claim 2, wherein the value of said VT(MS) is calculated by the equation, VT(MS)=VT(A)+Tx_window_size, wherein VT(A) is the sequence number of the next in-sequence PDU expected to be acknowledged.

5. The method as claimed in claim 2, wherein the value of said VT(S) is updated by the equation, VT(S)=VT(S)+1 and must satisfy the equation, VT(A)=<VT(S)<VT(MS).

6. The method as claimed in claim 5, wherein said VT(A) represents the lowest sequence number of said protocol data units subjected to be transmitted, and the value of said VT(A) is updated to the lowest sequence number of said protocol data units required to have an acknowledgement status.

7. The method as claimed in claim 5, wherein an error is reported to an upper layer when said equation, VT(A)=<VT(S)<VT(MS) is not satisfied.

8. The method as claimed in claim 1, further comprising the step of sending said protocol data unit having its sequence number equal to the value of said VT(S) when said condition is satisfied.

9. The method as claimed in claim 2, further comprising the step of exiting if the value of said VT(S) is equal to said VT(MS)−1.

* * * * *